3,327,020
POLYMER CRYSTALLIZATION
Frederik L. Binsbergen, Amsterdam, Netherlands, assignor to Shell Oil Company, New York, N.Y., a corporation of Delaware
No Drawing. Filed May 25, 1964, Ser. No. 370,062
Claims priority, application Netherlands, May 30, 1963, 293,398
16 Claims. (Cl. 260—878)

This invention relates to improved crystallization methods for the production of composites of solid crystalline polymers with crystallization modifying additives. The methods of this invention result in the production of modified polymers having improved physical properties.

The invention relates more specifically to an improvement in a crystallization method for the production of shaped articles, and of resin composites suitable for use in producing shaped articles, from resins consisting substantially of crystallizable olefin polymers, particularly those produced from alpha-monoolefins in the presence of low pressure catalysts of the Ziegler-Natta type. The invention is of outstanding advantage when used with isotactic polypropylene and will be illustrated largely with reference thereto.

Solid polypropylene is a new thermoplastic polymer which has recently achieved commercial importance. By use of appropriate conditions and catalysts it can be produced in a sterically regulated form known as isotactic polypropylene. It is difficult, if not impossible, to polymerize propylene to a polymer which has 100% isotactic structure. However, it is possible to produce, with commercially practical catalysts, polymers which have a high proportion of segments that are completely isotactic. A property which is associated with isotacticity of polypropylene is the capacity of a melt thereof to solidify in crystalline form.

Following conventional terminology, reference to "crystalline" polymers means, unless the context indicates otherwise, solid polymers having a high degree of crystallinity at least 50%, as determined by X-ray analysis or comparable methods. In general, polypropylene having a crystallinity of this order contains at most only a very small proportion of material which is extractable in non-aromatic hydrocarbons such as gasoline boiling range hydrocarbons. Typically, the proportion of highly crystalline polypropylene which is extractable in boiling heptane or isooctane is less than 10% and usually less than 5%. Similarly, "crystallizable" polymers are those which have a molecular arrangement that enables them to solidify from a melt in a highly crystalline structure. The general practice in the art is to refer to "crystalline" or "crystallizable" polymer, rather than "partially crystalline" or "partially crystallizable" polymer, even though olefin polymers of 100 percent crystal structure are not known to exist. For example, a crystallinity of 70% is extremely high for isotactic polypropylene. Normally solid, crystalline polypropylene usually has a viscosity average molecular weight of at least about 40,000 and generally between 100,000 and 1,200,000. For convenience the molecular weight is usually expressed in terms of intrinsic viscosity. The intrinsic viscosity of polypropylene, measured in decalin at 150° C., is generally between 1.0 and 6 dl./g. but may be as low as 0.5 or less and as high as 10 or more.

Reference to "polymers" herein includes both homopolymers and copolymers unless the context indicates otherwise.

Crystalline polymers, in their usual form, have some outstandingly good properties and some undesirable ones. For example, desirable properties of highly crystalline polypropylene are high tensile strength and substantial hardness. One disadvantage of the usual forms of highly crystalline polypropylene is a lack of transparency or clarity, which shows up as haze in thin films and as translucency, decreasing to ultimate opacity, in articles of progressively increased thickness. Another disadvantage of the usual forms of highly crystalline polypropylene is a relatively low impact resistance. This handicaps the use of isotactic polypropylene for making vessels or containers which during use may be subject to mechanical shock.

Polypropylene, like many other crystalline polymers, crystallizes from a melt in a form in which the individual crystals are associated in spheroid or ellipsoid bodies known as spherulites. Generally, clarity and some mechanical properties of articles made from polypropylene are better when the spherulites are relatively small.

It has been proposed to add a variety of materials to polyolefins to improve polymer properties related to the rate of crystallite and spherulite growth.

It has now been found that alkali metal salts of certain carboxylic acids can be used as polymer additives to modify the crystallization process and thereby provide substantial improvements in physical properties of solid polypropylene and in mechanical properties of articles produced therefrom, especially those properties which are related to crystallite and spherulite structure of the polymer. Similar improvements of other crystallizable polymers may be obtained by use of additives of the same type. In many instances minute amounts of the additives are extremely effective in modifying the crystallization process and crystal structure.

The preferred materials which result in the production of solid polypropylene of improved physical properties when used according to this invention are salts of sodium and of carboxylic acids selected from a certain limited group. For brevity, this group of compounds will sometimes be referred to herein as "alkali metal salts of alkenoic acids." Effective compounds of this type are identified in detail hereinafter.

The improvements of this invention are obtained when a compound such as one of said alkali metal salts of alkenoic acids is present in dissolved or thoroughly dispersed form in the polymer melt prior to the final crystallization thereof by cooling.

It is a specific object of this invention to provide an improved crystallization method for the production of composites of polypropylene with crystallization modifying additives.

It is another specific object of this invention to provide articles of crystalline polypropylene which, by virtue of an improved crystal structure, have improved mechanical properties and clarity.

It is another object to provide in improved crystallization method for the production of composites of crystallizable polymers, such as linear polymers of alpha-monoolefins, with crystallization modifying additives.

Another object is to provide articles of crystalline polymers such as linear polymers of alpha-monoolefins which, by virtue of an improved crystal structure, have improved mechanical properties and improved clarity.

It is a major object of this invention to provide a novel method for causing crystallizable polypropylene to crystallize with a very fine spherulite structure.

Other objects will become apparent from the following description of this invention.

According to this invention, solid crystalline polypropylene and other similar solid crystalline polymers of substantially improved physical properties are prepared by carrying out at least the final crystallization from a melt comprising the normally solid, crystallizable polypropylene or other polymer, together with a small, effective amount of at least one of said alkali metal salts of alkenoic acids.

In another aspect, this invention comprises improved articles of solid crystalline polypropylene or other similar solid crystalline polymers, prepared by crystallizing a melt of crystallizable normally solid polypropylene or other similar polymer, containing a small, effective amount of at least one of said alkali metal salts of alkenoic acids.

Several properties of the articles produced from normally solid crystalline polymers according to this invention are improved thereby. The improvement will vary, depending on the particular polymer used, other additives used therewith, the particular compound selected from the group of alkali metal salts of alkenoic acids, and the conditions under which the final solidification of the melt takes place.

Generally, it is found that the spherulite dimensions in the crystallized articles produced according to this invention are substantially smaller than they would be in an article produced in identical manner from the same polymer but without using one of said alkali metal salts of alkenoic acids.

It is also generally found that the clarity of film or of thicker shaped articles produced from compositions according to this invention is substantially improved, compared to that of articles produced in identical manner from the same polymer without one of said alkali metal salts of alkenoic acids, particularly when the final cooling step is under non-flow conditions.

The modulus of elasticity of polymer produced according to this invention generally is increased over that of the identical polymer crystallized in identical manner without one of said alkali metal salts of alkenoic acids. Similarly, tensile strength and other tensile properties are improved.

One of the advantages of this invention is that injection molding of polypropylene containing an alkali metal salt of an alkenoic acid in accordance with this invention can be successfully carried out over a much wider range of temperature and pressure conditions than in the absence of crystallization modifying compounds. The area of a "molding diagram," for modified polymers, i.e., the area on the plot of cylinder temperature vs. ram pressure which covers satisfactory conditions, is much greater than that obtained with unmodified polymer.

Another advantage is that the mixtures according to this invention solidify at a higher temperature than those of otherwise identical polymers not containing said alkali metal of alkenoic acids. Hence, processing can generally be carried out in a shorter period of time. Another advantage of this invention is that it is possible to apply the process to highly crystalline polymers which have a relatively low melt index, allowing their being processed at lower temperatures.

It is further often found that impact resistance is greater in articles produced according to this invention than in those identically produced from identical polymer without one of said alkali metal salts of alkenoic acids, particularly when the final cooling step is under non-flow conditions.

In the compounds of the type of alkali metal salts of alkenoic acids, the preferred metal is sodium. Similar salts of lithium, potassium, rubidium and cesium are similarly effective.

The carboxylic acids whose alkali metal salts are effective in accordance with this invention are unsaturated monocarboxylic acids having from 4 to 25 carbon atoms per molecule, and having the carboxyl group attached to an alkenyl group.

A wide and, at present unexplained variability in effectiveness of members of this group of compounds has been observed.

Representatives of the aforesaid alkali metal salts that have proved to be especially suitable for the object of the invention are such salts of which the alkenyl group contains at least 3 carbon atoms.

Of the alkali metal salts that are applied according to this invention, the alpha-beta unsaturated compounds are preferred of which at least the alpha or the beta-carbon atom is quaternary. In these salts, acyclic and/or cyclic hydrocarbon groups may be attached to the alpha and/or beta-carbon atoms. The cyclic groups may be aromatic, cycloaliphatic or heterocyclic groups. The cyclic hydrocarbon groups may also carry as substituents one or more aliphatic groups. The branches at the alpha or beta-carbon atom may consist of an aliphatic hydrocarbon group containing one or more cyclic groups.

In general the preferred alkali metal salts are those in which the alpha-carbon atom is linked by a double bond to the beta-carbon atom. In those compounds in which the alpha-carbon atom is linked by a double bond to a beta-carbon atom whose only substituent is an unsubstituted phenyl group, the alpha-carbon atom is tertiary or quaternary.

One or more of the carbon atoms of the alkali metal salts according to the invention may furthermore carry a substituent that does not consist of a hydrocarbon group, for instance a halogen atom, a hydroxyl group, an amino group, an esterified carboxyl group or an ether group.

Insofar as salts of acyclic carboxylic acids are applied, the total number of carbon atoms preferably does not exceed 12.

Very good results are obtained with the alkali metal salts of methacrylic acid and alpha,beta-dimethylacrylic acid. Suitable representatives of the acyclic category are also the salts of crotonic acid, and of beta,beta-dimethylacrylic acid and of trimethylacrylic acid.

Representatives of the salts containing cyclic groups that can be especially recommended are the alkali metal salts of the beta-phenylacrylic acids of which either the alpha-carbon atoms is branched or whose beta-carbon atom carries a second substituent, in particular the salts of alpha-methyl beta-phenylacrylic acid and beta,beta-methylphenylacrylic acid.

Good results are further obtained with alkali metal salts of this group of the alpha-phenylacrylic acids, for instance alpha-phenyl-acrylic acid, alpha,beta-diphenylacrylic acid, alpha-phenyl,beta-methylacrylic acid and triphenylacrylic acid.

Examples of other salts that can be used according to the process concerned are further the alkali metal salts of carboxylic acids that are analogous to those mentioned, but in which one or more phenyl groups have been replaced by cyclohexyl or cyclohexenyl groups, and/or one or more methyl groups have been replaced by ethyl groups.

The alkali metal salts may, if desired, be applied in the form of addition compounds with carboxylic acids, as a rule with carboxylic acids of the category described. In that case the carboxylic acid may be the same acid as the one from which the alkali metal salt is derived. It is, however, also possible to use addition compounds in which the carboxylic acid to which the salt is added and the carboxylic acid from which the salt is derived, are not identical.

The salts used are effective in low concentrations and are preferably used in such low concentrations. Suitable concentrations are in the range up to 5 percent by weight, based on the total mixture. A preferred lower concentration limit is about 0.01 percent by weight, although lower concentrations may be effective in some cases. Compounds are preferably employed in concentrations in the range from 0.05 to 2 percent by weight. Although still higher concentrations may be used, no further benefit of the kind described is generally obtained thereby.

The process of this invention may be carried out with a single crystallization modifying compound of the type described, or with a mixture of two or more of such compounds.

If desired, other additives may be present in the olefin polymer. Crystallization modifying additives of other types may be added. Other additives, which are conventionally added, include antioxidants, stabilizers against ultraviolet radiation, and the like. They may be added at any convenient stage of processing.

The present invention is advantageous when used with clear, unpigmented, unfilled polymers. However, the additives of this invention are also compatible with conventional fillers and pigments.

While this invention is most advantageous in providing improved articles of crystalline polypropylene it may also be employed with advantage in improving products made from other crystallizable hydrocarbon polymers, particularly alpha-olefin polymers and copolymers. Specific examples are linear polymers of ethylene, 1-butene-4-methyl-1-pentene, and 1-hexene, crystalline copolymers of propylene with ethylene, 1-butene and the like, and crystalline polystyrene. Particularly desirable improvements are obtained, for example, in block polymers, such as those consisting predominantly of isotactic polypropylene having small amounts of ethylene, e.g., between 1 and 10 percent, coplymerized therewith by block polymerization. A preferred group are isotactic polymers of alpha-monoolefins having at least 3 and up to 8 carbon atoms per molecule. Polymers of alpha-monoolefins having from 2 to 4 carbon atoms are another preferred group. Polymers which can be improved according to this invention have molecular weights and crystallinities in the range described above for polypropylene.

In one mode of practicing this invention, elastomeric polymer is added to the polyolefin as a property-modifying additive, together with an alkenoic acid salt. The addition of elastomers confers an improvement in some of the mechanical properties of crystalline polymers, e.g., the impact strength. Suitable elastomers in general are predominantly amorphous polymers having a glass transition point of less than 10° C., measured according to ASTM test D1403–51. Suitable elastomers include as a preferred group rubbery copolymers of ethylene with alpha olefins such as propylene or 1-butene, or other elastomeric olefin copolymers, including ter-polymers of two monoolefins and a diolefin, e.g., dicyclopentadiene, and amorphous homopolymers of monoolefins, such as amorphous polypropylene. Other elastomers may be used, such as natural rubber, polyisobutylene, Butyl rubber, butadiene-styrene copolymers (SBR), butadiene-acrylonitrile copolymers (NBR), polybutadiene or polyisoprene, particularly those of high cis-1,4 content, silicone rubbers, and the like. The elastomers which are added preferably have weight average molecular weights in excess of 50,000 suitably from 100,000 to 500,000. Elastomer may be added in concentrations up to 35 percent by weight, as a rule not more than 20 percent, and preferably between 3 and 15 percent. Use of basic aluminum salts together with elastomers provides polymer of improved properties, particularly low temperature (0° C.) impact resistance.

The polymers which are modified according to this invention are produced by polymerizing propylene or other suitable olefins by contact with a highly stereospecific catalyst system. A great variety of stereospecific catalysts have been described in the literature. They are generally species of modifications of the so-called Ziegler catalysts or Natta catalysts.

The Ziegler-type catalysts may be designed "metal alkyl-reducible metal halide type," and the Natta type catalysts "performed metal subhalide type." This terminology is used, for example, in "Polyolefin Resin Processes" by Marshall Sittig, Gulf Publishing Company, Houston, Texas, 1961. These well-known catalysts are the reaction products of halides, in order of preference chlorides and bromides, of transition metals from subgroups b of groups 4 and 5 of the Periodic Chart of Elements, i.e., of Ti, Zr, Hf, V, Nb, or Ta, with organometallic reducing agents in which the metal is from groups 1, 2 or 3. Preferred reducing agents are organoaluminum compounds and particularly aluminum alkyls, including aluminum alkyl halides. The most effective catalysts for the production of isotactic polypropylene known to date are those prepared from certain forms of titanium trichloride and certain aluminum alkyls and aluminum alkyl halides.

In the production of crystalliazle alpha olefin polymers, the reaction mixture formed in the low pressure polymerization is treated to deactivate the catalyst, usually by contact with a polar compound such as an alcohol and/or hydrochloric acid, and is subsequently washed for removal of at least a substantial portion of the catalyst residue. The resulting polymer almost invariably contains at least traces of the catalyst residue. Typically it may contain 50 parts per million (p.p.m.) of each of the catalyst components, calculated as the corresponding metal. A carefully purified polymer may contain as little as 1 p.p.m. of each metal or less. The additives of this invention are useful in polymers which contain relatively low amounts of the residue of said catalyst components, e.g., less than 50 p.p.m. calculated as the corresponding metal, and especially in those containing from 0 to 10 p.p.m. However, they provide equally good results when used in polymers containing large amounts of catalyst residue.

Various methods may be employed for introducing the additive of this invention into the polymer. It is generally preferred to add the additive after the polymerization reaction has been completed, the active catalyst has been killed and the predominant part of the catalyst residue washed out of the polymer. The additive may, for example, be added to the washed polymerization slurry; the slurry is then dried and a dry mixture of additive and polymer is recovered. Alternatively, additive may be added to the dry polymer either when the polymer is in the form of a powder fluff or in the form of shaped pellets or the like. It is also possible to add the additive to the crystallizable polymer after it has been melted.

Another method of mixing the alkali metal salts with the crystalline polymers is that in which the salts are dissolved in water, these solutions being mixed with the crystalline polymers, the salts then being precipitated with the aid of a salting-out agent, for instance acetone. The water and the salting-out agent are subsequently removed by mechanical means, for instance by filtration or centrifuging.

It is essential for effective results that a substantially homogeneous distribution of the additive in the molten polymer be obtained prior to the final crystallization of the polymer. To promote mixing of the polymer and the additive it is best to apply mechanical mixing at temperatures at which the polymer has a relatively low viscosity, i.e., a temperature exceeding the melting temperature of the polymer by from 20° to 150° C. These conditions are particularly important when products of greatly enhanced transparency are desired.

The additives may be present in the polymer melt in true solution or in uniform dispersion, e.g., as colloidal suspensions of liquids or solids. In one mode, extreme effectiveness is obtained by using them as solids of from 0.01 to less than 1 micron diameter.

An essential step in the process according to this invention is the cooling of the polymer containing the alkali metal salts as additive at conditions resulting in a crystalline polymer structure. The final cooling step in the production of a shaped article determines those of its effective properties which depend on crystal structure. Whereas in the absence of crystallization modifying additives slow cooling leads to formation of excessively larger spherulites, and rapid cooling tends to lead to incompletely crystallized polymer, i.e, polymer having a lower degree of crystallinity than it is capable of achieving, the use of additives of this invention generally result in a polymer having a high degree of crystallinity and a fine spherulite structure regardless of whether the cooling is carried out very rapidly or over a relatively longer period of time. Rapid cooling can be carried out as quickly as heat conduction permits. This is, of course, a function of the geometry and heat removal capacity of each system. It can be completed in seconds in the production of film. Slow cooling may be carried out over a period from several minutes to several hours.

Cooling of the polymer mixture can take place in any suitable apparatus. Cooling is usually carried out in conventional apparatus associated with the production of shaped articles from olefin polymers.

The manner in which mixing takes place provides a uniform distribution of the crystallization promoting additive in the polymer. This uniform distribution remains substantially unaffected during the crystallization, both when crystallization progresses very rapidly and when there is a considerable temperature gradient, as in the cooling of large objects.

Shaped articles from product according to this invention may be, for example, bars, sheets, films, tapes, granules, rods or flakes, molded or extruded large or small shapes or filament. Shaped articles according to this invention may be manufactured from the mixtures according to this invention by casting, compression molding or injection molding; films may be obtained by blowing or by slit extrusion; filaments, bars, tapes and the like, may be obtained by extrusion. If desired these can be reduced, by chopping, to the form of granules, chips or the like. Filaments can be stretched to obtain further improvement of properties. Other known methods of forming shaped polyolefin articles are equally adapted to use with mixtures according to this invention.

The invention will be further described by reference to the following examples, which are not to be interpreted as limiting the invention but are merely intended to be illustrative of the invention.

*Example*

A number of experiments were carried out by mixing each time 2 mg. of sodium salt of one of the carboxylic acids listed in the table below with 200 mg. of polypropylene. The mixing was effected in a high-speed vibrating ball mill.

The polypropylene had been prepared in a medium of technical isooctane, using a mixture of gamma-titanium trichloride and aluminum diethyl chloride as the catalyst-forming components. This polymer had a melt index of 1.0, an intrinsic viscosity (measured in decahydronaphthalene at 135° C.) of 3.9 and a solubility in cold hexane of 6% by weight. The polymer also contained $16 \times 10^{-4}\%$ by weight of aluminum and $20 \times 10^{-4}\%$ by weight of titanium.

To a sample of each of these powder mixtures and to a 200 mg. sample of the original polypropylene powder were added at room temperature 0.15% by weight of 4,4'-thio-bis(6-tert-butyl metacresol) and 0.6% by weight of dilauryl thiodipropionate.

With 5 mg. of each mixture a film 0.04 mm. in thickness was pressed at 200° C. between a cover glass and an object glass. The polymer was then allowed to crystallize by letting the microscope preparations thus made cool down in the air. Then, with the aid of a polarization microscope and a photomultiplier the depolarization of linearly polarized light that was caused by the preparations was measured. The photomultiplier was put in the eyepiece-tube and the light intensity striking the photomultiplier was measured, both with crossed and parallel polarizers, a virtually parallel beam of light being applied as the standard condition. Care was taken to ensure that the parts of the preparations to be measured were free of orientation double refraction.

The results of the measurements are recorded in Table 1. The depolarization value $\Delta$ is the quotient of the intensity measured with crossed polarizers and the intensity measured with parallel polarizers. It is expressed in parts per thousand (p.p.t.).

In the case of the preparation in which no alkali salt had been incorporated the depolarization was about 100 p.p.t.

On this scale, the lowest values are indicative of the best nucleation effect. Values below 10 show that the product is a good nucleating agent. Values between 10 and below 50 show that it is a fairly good nucleating agent. A value of 50 is indicative of moderate nucleating activity at the conditions of the test.

It has been shown in studies with a variety of nucleating agents in polypropylene that those for which measurements such as the above show a significant nucleation effect also cause the improvements in mechanical properties described hereinbefore.

TABLE 1

| Sodium salt of: | Depolarization $\Delta$, p.p.t. |
|---|---|
| Acrylic acid | 50 |
| 3-butenoic acid | 50 |
| Methacrylic acid | 10 |
| Alpha,beta-dimethylacrylic acid | 13 |
| Beta,beta-methylphenylacrylic acid | 7 |
| Cinnamic acid | 15 |
| Beta-methyl cinnamic acid | 7 |

I claim as my invention:

1. The method of producing polypropylene articles which comprises
   (A) dispersing in
      (a) polypropylene having a viscosity average molecular weight of at least 40,000 and a crystallinity of at least 50 percent, as measured by X-ray analysis,
      (b) sodium salt of methacrylic acid in an amount in the range 0.05 to 2 percent by weight, based on the polymer,
   (B) melting the resulting mixture,
   (C) shaping the melt into a desired shape, and
   (D) solidifying the melt by cooling it.

2. The method of producing polypropylene articles which comprises
   (A) dispersing in
      (a) polypropylene having a viscosity average molecular weight of at least 40,000 and a crystallinity of at least 50 percent, as measured by X-ray analysis,
      (b) sodium salt of beta-methylacrylic acid in an amount in the range 0.05 to 2 percent by weight, based on the polymer,
   (B) melting the resulting mixture,
   (C) shaping the melt into a desired shape, and
   (D) solidifying the melt by cooling it.

3. The method of crystallizing a crystallizable polyolefin which comprises
   (A) producing a melt of
      (a) normally solid, crystallizable polyolefin from 2 to 8 carbon atoms per molecule, containing
      (b) an effective amount, in the range from 0.01 to 5 percent by weight, of a crystallization modifying alkali metal salt of an acid having from 4 to 25 carbon atoms per molecule, selected from the group consisting of acyclic alkenoic acid having from 4 to 12 carbon atoms per molecule, and aryl-, cycloalkyl- and heterocyclic substituted alkenoic acids,
   (B) and solidifying said melt by cooling it.

4. A method according to claim 3 wherein said polyolefin is polypropylene.

5. A method according to claim 3 wherein said polyolefin is a block polymer consisting predominantly of polypropylene and to a minor extent of other alpha-monoolefin polymer.

6. The method of crystallizing crystallizable polypropylene which comprises
   A) admixing
      (a) normally solid, crystallizable polypropylene
      (b) with an effective amount, in the range of from 0.01 to 5 percent by weight, of a crystallization modifying sodium salt of an acid having from 4 to 25 carbon atoms per molecule, selected from the group consisting of acyclic alkenoic acid having from 4 to 12 carbon atoms per molecule, and aryl-, cycloalkyl- and heterocyclic-substituted alkenoic acids, (B) melting and mechanically working the resulting mixture at a temperature of from 20° to 150° C. above the melting point of the polypropylene, and (C) solidifying the melt by cooling it.

7. A method according to claim 6 wherein said acid is methacrylic acid.

8. A method according to claim 6 wherein said acid is beta-methylacrylic acid.

9. A method according to claim 6 wherein said acid is alpha,beta-dimethylacrylic acid.

10. A method according to claim 6 wherein said acid is beta-beta-methylphenyl acrylic acid.

11. A polypropylene composition of improved physical properties and reduced spherulite size, comprising (a) solid polypropylene having a highly crystalline structure, (b) an effective amount, in the range from 0.01 to 5 percent by weight, of a crystallization modifying alkali metal salt of an acid having from 4 to 25 carbon atoms per molecule, selected from the group consisting of acyclic alkenoic acid having from 4 to 12 carbon atoms per molecule, and aryl-, cycloalkyl- and heterocyclic-substituted alkenoic acids, (c) said salt having been dispersed in a melt of said polypropylene prior to the final solidification step.

12. A composition according to claim 11 wherein said salt is sodium salt of methacrylic acid.

13. A composition according to claim 11 wherein said salt is sodium salt of beta-methylacrylic acid.

14. As an article of manufacture, (a) shaped, crystalline polypropyllene of improved physical properties, (b) an effective amount, in the range from 0.01 to 5 percent by weight, of a crystallization modifying alkali metal salt of an acid having from 4 to 25 carbon atoms per molecule, selected from the group consisting of acyclic alkenoic acid having from 4 to 12 carbon atoms per molecule, and aryl-, cycloalkyl- and heterocyclic-substituted alkenoic acids, (c) said salt having been dispersed in a melt of said polypropylene prior to the final solidification step.

15. An article according to claim 14, wherein said salt is sodium salt of methacrylic acid.

16. An article according to claim 14, wherein said acid is beta-methylacrylic acid.

References Cited

UNITED STATES PATENTS

| | | | |
|---|---|---|---|
| 3,207,735 | 9/1965 | Wijga | 260—94.9 |
| 3,207,736 | 9/1965 | Wijga | 260—94.9 |
| 3,207,939 | 9/1965 | Waltes | 260—94.9 |

JOSEPH L. SCHOFER, *Primary Examiner.*

LAWRENCE EDELMAN, *Assistant Examiner.*